Mar. 6, 1923.
T. STRAWN.
PROCESS FOR DRYING FRUIT.
FILED JAN. 14, 1922.
1,447,493.
2 SHEETS—SHEET 1.
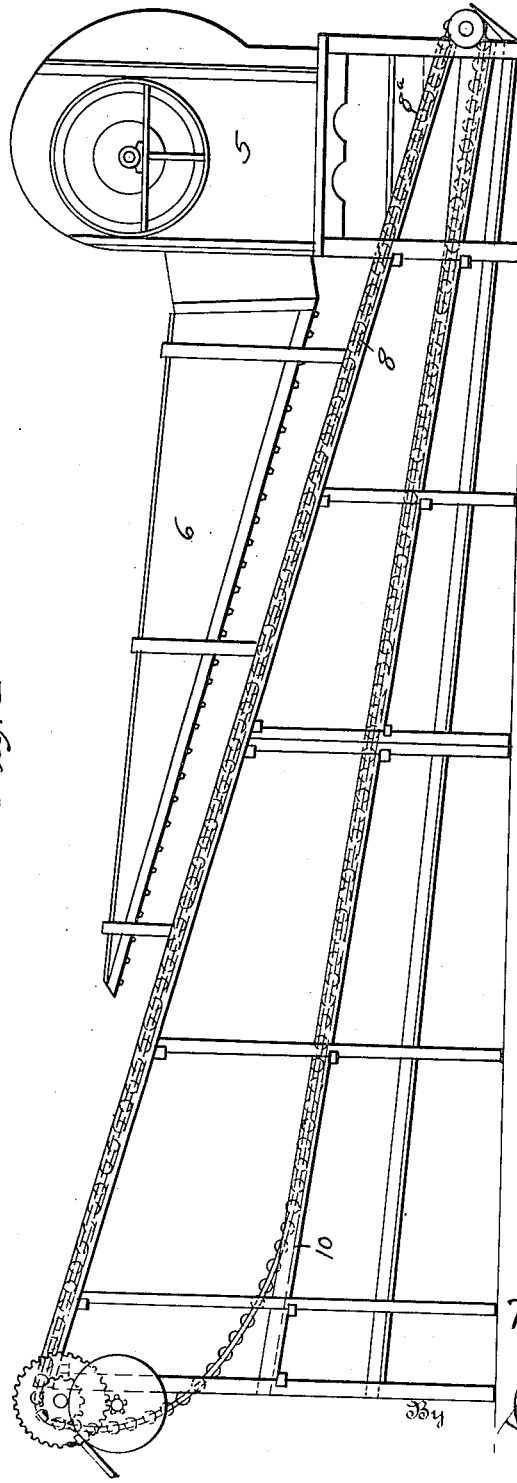
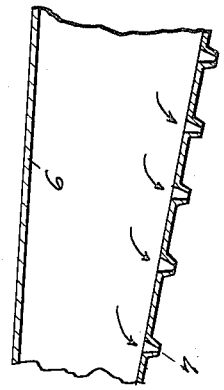
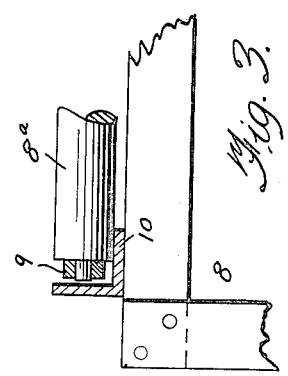
Inventor
Theodore Strawn,
By James Herrick,
Attorney

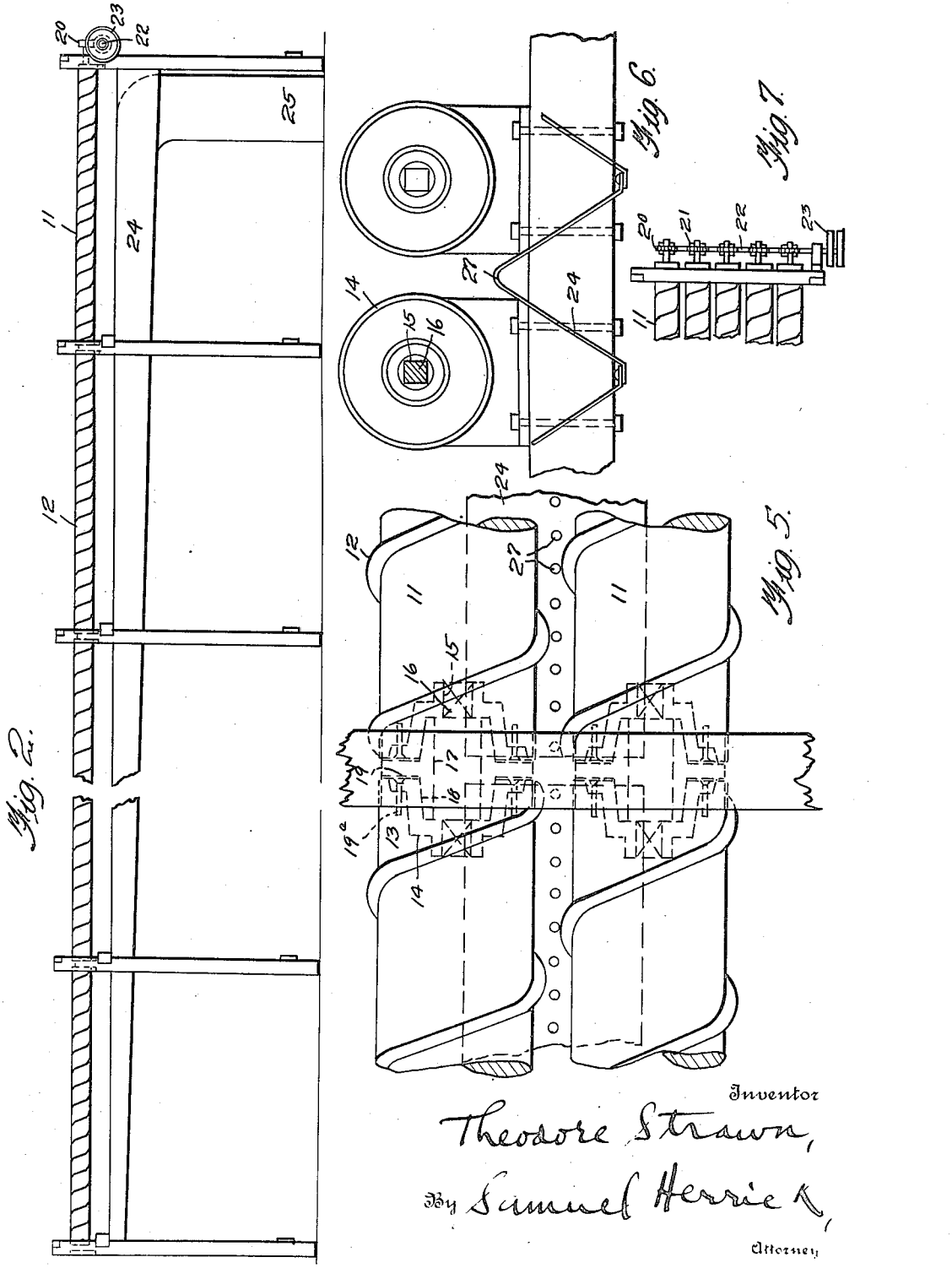

Patented Mar. 6, 1923.

1,447,493

UNITED STATES PATENT OFFICE.

THEODORE STRAWN, OF DE LAND, FLORIDA.

PROCESS FOR DRYING FRUIT.

Application filed January 14, 1922. Serial No. 529,173.

*To all whom it may concern:*

Be it known that I, THEODORE STRAWN, a citizen of the United States, residing at De Land, in the county of Volusia and State of Florida, have invented certain new and useful Improvements in Processes for Drying Fruit, of which the following is a specification.

This invention relates to a process for drying fruit and it has for its object to provide a process or method by means of which fruit discharged from a washer and in a wet condition may be very quickly brought to a dry condition without handling by hand.

In the accompanying drawings I have illustrated an apparatus adapted to carry out the process or method though it is to be understood that the method may be used in conjunction with other apparatus, if desired.

In the accompanying drawings:

Fig. 1 is a side elevation of a cold blast apparatus and the conveying mechanism associated therewith;

Fig. 2 is a side elevation of a warm air discharging apparatus and the conveyor associated therewith;

Fig. 3 is a fragmentary sectional view through one side of the conveying apparatus of Fig. 1;

Fig. 4 is a fragmentary sectional view through the discharge portion of the blower of Fig. 1;

Fig. 5 is a partial plan view upon an enlarged scale of some of the conveying rollers of Fig. 2;

Fig. 6 is a fragmentary transverse sectional view through a pair of the rollers of Fig. 2 showing the warm air box associated with the under sides of said rollers; and Fig. 7 is a fragmentary plan view showing the driving means for the several rollers of Fig. 2.

Briefly stated the method constituting the subject matter of the present invention resides in subjecting fruit, such as oranges for example, upon their discharge from a washing machine and when they are covered with drops of water, to the action of a cold air blast of such velocity that the drops of water are blown bodily from the fruit. Thus the surface water is gotten rid of with great rapidity. From the first conveying means the fruit is delivered to a second conveying means having associated therewith a warm air discharging means so that at the second step the fruit is subjected to the action of warm air which acts to dry out the surplus moisture in the pores of the fruit. By this method the fruit may be handled much more rapidly than by known methods, with a marked saving in time and expense.

In carrying out the invention a powerful blower 5 is arranged to discharge into a box like structure 6 having openings 7 formed in its bottom through which air at high velocity is discharged upon the fruit which is carried along beneath the box 6 by means of a conveyor 8. This conveyor preferably consists of a plurality of rollers 8ª carried by chains 9 and the undersides of these rollers engage strips 10 so that the rollers are caused to turn as they move slowly along. Thus a constant turning movement is imparted to the oranges or other fruit to expose all portions of the fruit to the action of the blast of air from the openings 7.

The roller conveyor described receives the oranges from the washer and the blasts of air discharged from the openings 7 is at such velocity that the surplus water is blown bodily from the fruit. This water is not merely dried off but, as before stated, is blown bodily from the fruit and thus the freeing of the fruit of the surplus water is accomplished with great rapidity.

From the roller conveyor shown in Fig. 1 the fruit passes to the warm air drying conveyor illustrated in Fig. 2. This consists of a plurality of hard wood rollers arranged in parallelism, as indicated at 11. Rubber strips 12 are arranged in spiral formation on the wooden rollers and act to impart longitudinal movement to the fruit while at the same time imparting a bodily turning movement to the fruit. Those rollers which are in longitudinal alinement with each other are connected end to end by means of couplings 13. These couplings consist of socket plates 14 having angular openings 15 formed therein which receive the angular ends 16 of a coupling pin 17. This coupling pin is received in a hub 18 that is provided with a flange 19, said flange projecting outwardly between the confronting faces of the sockets 14. The sockets 14 are secured to the ends of the rollers by screws 19ª.

There may be as many of the rollers 11, as desired, to make up a conveyor of the necessary width and at their ends these rollers may be provided with worm wheels 20 which mesh with worm wheels 21 upon a transverse shaft 22. Power may be applied to a pulley 23 upon this shaft for the purpose of imparting the necessary rotation to the several rollers. A hot blast box 24 which may receive hot air under pressure through a vertical flue 25 from a furnace or other source of heat (not shown) extends longitudinally beneath the rollers and has a plurality of portions of inverted V-shape along its top constituting peaks which underlie the openings between the several rollers. Openings 27 are formed along these inverted V-shaped portions 26 so that warm air is discharged upwardly through these openings and between the several rollers 11. This warm air acts to thoroughly dry out the moisture left in the pores of the fruit and this drying action is facilitated by the fact that the oranges are being given a constant turning movement as they travel along the rollers.

Having described my invention what I claim is:

1. The herein described method of drying fruit which consists in first subjecting said fruit to the action of an air blast of such velocity as to bodily blow surplus water from the fruit and thereafter subjecting said fruit to the action of a warm air blast to dry out the moisture in the pores of the fruit.

2. The herein described method which consists of imparting bodily turning movemen to fruit while subjecting the same to the action of an air blast of such velocity as to blow surplus water from the fruit and thereafter subjecting said fruit, while turning the same, to the action of a warm air blast to complete the drying of the fruit by evaporation of the moisture in the pores.

In testimony whereof I affix my signature in the presence of two witnesses.

THEODORE STRAWN.

Witnesses:
 RAY H. JORDAN,
 HELEN C. WRIGHT.